United States Patent [19]

Okumura et al.

[11] Patent Number: 4,786,186
[45] Date of Patent: Nov. 22, 1988

[54] STIRRER FOR USE IN LIQUID STORAGE TANKS, AND A METHOD FOR DETERMINING ITS POSITION IN THE TANK

[76] Inventors: Katsuji Okumura; Hiroshi Maeda; Isao Taoka, all of Tokyo, Japan

[21] Appl. No.: 57,454

[22] Filed: Jun. 3, 1987

Related U.S. Application Data

[62] Division of Ser. No. 861,012, May 8, 1986.

[30] Foreign Application Priority Data

May 14, 1985 [JP] Japan .................................. 60-102118
May 14, 1985 [JP] Japan .................................. 60-102119

[51] Int. Cl.$^4$ .................................................. B01F 7/06
[52] U.S. Cl. .................................. 366/348; 366/297; 366/330
[58] Field of Search ............... 366/348, 349, 297, 279, 366/330, 270, 298–300, 292, 281, 282, 116–118; 134/1, 184; 422/22–24

[56] References Cited

U.S. PATENT DOCUMENTS

| | | | |
|---|---|---|---|
| 3,873,071 | 3/1975 | Tatebe | 366/113 |
| 3,946,829 | 3/1976 | Mori et al. | 366/114 X |
| 3,972,614 | 8/1976 | Johansen et al. | 366/127 X |
| 4,168,916 | 9/1979 | Yamada et al. | 366/116 |

*Primary Examiner*—Timothy F. Simone
*Attorney, Agent, or Firm*—Frank J. Jordan

[57] ABSTRACT

A device with vertical buoyancy tanks fitted to its upper part is provided with rotors which generate horizontal and vertical propulsion, and which stirs the liquid uniformly as it moves freely through a liquid storage tank, thereby preventing the accumulation of sludge. The vertical buoyancy tanks stabilize the stirrer and provide a restoring force if the stirrer is upset. The stirrer is fitted with an ultrasonic wave emitter, and ultrasonic receptors are installed at several positions in the liquid tank. An ultrasonic pulse is emitted after a certain interval when the stirrer is at rest on the bottom of the tank. The position of the stirrer is computed for each pulse emission, and the average is taken to give the actual position of the stirrer.

11 Claims, 7 Drawing Sheets

STIRRER FOR USE IN LIQUID STORAGE TANKS, AND A METHOD FOR DETERMINING ITS POSITION IN THE TANK

This is a division of application Ser. No. 861,012, filed May 8, 1986.

BACKGROUND OF THE INVENTION

This invention relates to a device for stirring liquid in a storage tank while moving around in the tank, thus redissolving sludge which has separated out from the liquid, and preventing the accumulation of sludge on the bottom of the tank. It also relates to a method for determining the position of the stirrer in the tank so that the motion of the stirrer may be controlled.

In large tanks used for storage of liquid, (for instance, crude oil, residual oil, etc.) sludge may gradually separate out from the liquid over long periods of time. If this sludge is allowed to build up on the bottom of the tank, the quantity of liquid which can be stored in the tank is effectively reduced, and the tank must therefore be cleaned regularly to remove accumulated sludge. In order to clean the tank, it is necessary to drain off all the liquid. A device was therefore developed to obviate this necessity, consisting of a stirrer rotor inside the tank rotated by a motor outside the tank, which stirred the liquid and prevented sludge from separating out. The position of these stirrer rotors was however fixed, which meant that similar device had to be installed at a large number of points around the circumference of the tank. This solution is not practical and does not permit efficient stirring in the center area of the tank.

In order to solve this problem, the Applicant, in Japanese Patent Publication No. 59-46658 and Japanese Patent Provisional Publication No. 58-214383, proposed a device which stirred the liquid while moving around in the tank. This stirrer has rotors which permit it to move up and down, and rotors which permit it to move in a horizontal direction. By controlling these rotors from outside, the stirrer can be made to move around freely inside the tank. The liquid in the tank can therefore be stirred uniformly, sludge can be redissolved, and sludge can be prevented from accumulating anywhere on the bottom of the tank.

In order to lighten the weight of the stirrer and enable it to move smoothly through the liquid, it was suspended by a rope from a float to give it buoyancy. However, as the stirrer was suspended from the float, the stirrer sometimes lost its balance when it was moved horizontally or rotated, and sometimes collided with the tank inner wall.

Further, in order to move the stirrer to a desired location somewhere in a large tank by means of an external operation, it is necessary to determine the actual position of the stirrer at any time. As liquid storage tanks are usually completely enclosed, however, the position of the stirrer cannot be confirmed from outside.

The Applicant, in Japanese Patent Provisional Publication No. 58-213210, proposed a device for determining the position of the stirrer wherein a wire wound around a drum was suspended from the roof of the storage tank and connected to the upper part of the stirrer, the direction and length of wire released, as measured by a potentiometer or other means, being used to determine the position of the stirrer.

The structure of this device is however complex, and if the direction and length of wire released are not measured with a high degree of precision, it is difficult to determine the position of the stirrer with accuracy. Further, as the wire is paid out over a long distance, it sometimes goes slack or becomes entangled with the electric cable of the stirrer.

SUMMARY OF THE INVENTION

The object of the present invention, therefore, is to provide a stirrer which can move smoothly in both horizontal and vertical directions in the liquid in the tank, and which is stable to change of direction.

A further object of this invention is to provide a method for determining the precise position of the stirrer.

For these purposes, vertical buoyancy tanks are fitted to the upper part of the frame which constitutes the skeleton of the stirrer, and a perpendicular flow plate is provided on the lower part of the frame. A pair of motor-driven horizontal rotors are arranged on either side of the flow plate in order to provide propulsion in a horizontal direction. In addition, an elliptical housing for enclosing a pair of vertical rotors, also motor-driven, is fitted to the lower part of the flow plate which provide propulsion in a vertical direction. The rotation of the motors is controlled by a control unit connected to the stirrer by a cable. The flow set up in a horizontal direction by the horizontal rotors causes the stirrer to move horizontally in the opposite direction to the flow, while the flow set up in a vertical direction by the vertical rotors causes the stirrer to rise and fall in the opposite direction to the flow. At the same time, a flow of liquid in set up in the tank, and this stirring action causes sludge to redissolve in the liquid. Due to the vertical buoyancy tanks fitted to the upper part of the frame in a one-piece construction, there is a strong vibration damping action and a restoring action which prevent the stirrer from being upset and maintain it in its correct orientation.

Due to the floats, the weight of the stirrer in the liquid is practically zero. The driving force required to lift the stirrer is thus reduced and, by decreasing the speed of the stirrer when it is falling, a collision with the bottom of the tank is prevented.

The flow plate is parallel to both the horizontal and vertical directions of the rotors, which stabilizes the orientation of the stirrer when it is moving.

In this invention, in order to determine the position of the stirrer in the liquid storage tank, an ultrasonic wave emitter is fitted to the stirrer, and several receptors are installed at different points inside the tank to receive the ultrasonic wave so emitted. A computing device is provided to compute the position of the stirrer, which functions by determining the time taken by each receptor to receive this ultrasonic pulse. The time taken to receive the pulse from the ultrasonic wave emitter is directly proportional to the distance to each receptor, and so the position of the stirrer can be found from these times. To reduce errors due to noise when the measurements are being carried out, all motors are stopped, and the stirrer allowed to settle on the tank bottom before emitting an ultrasonic pulse from the emitter. This emission is repeated several times. The period between emission of pulses is chosen to be greater than a time interval equivalent to the time taken to traverse the greatest distance inside the tank plus the time taken for attenuation of echos due to reflections from the tank inner wall. As measuring errors arise if the echos of the ultrasonic pulses are used, distances are measured using the time taken for the first pulse to be received in each emission cycle. The position of the stirrer is computed for pulses in several cycles, and the average value obtained is taken to be the actual position.

The above object, other objects and advantages of this invention will be made clearer by the following description and reference to the attached drawings.

DETAILED DESCRIPTION OF THE PREFERRED EMBODIMENT

Figure 1:
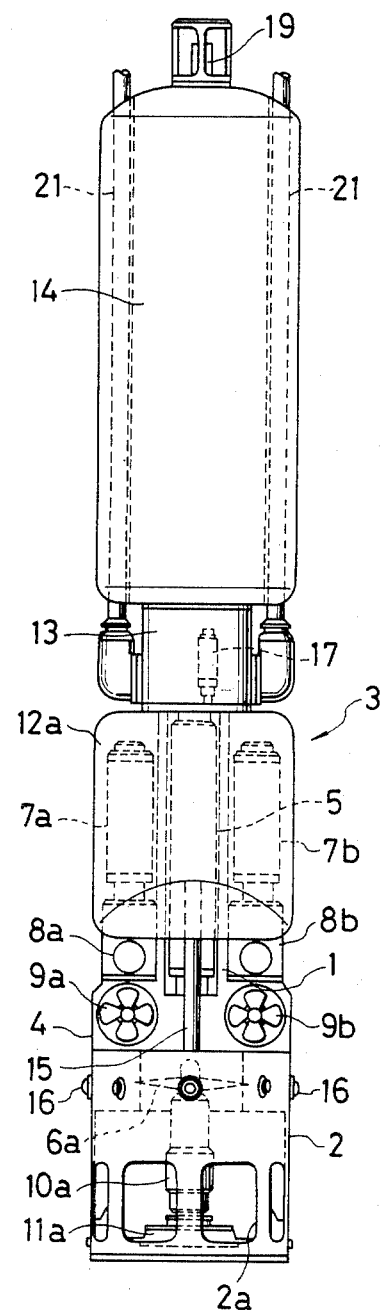
FIG. 1 is a front view of the stirrer of this invention.
Figure 2:
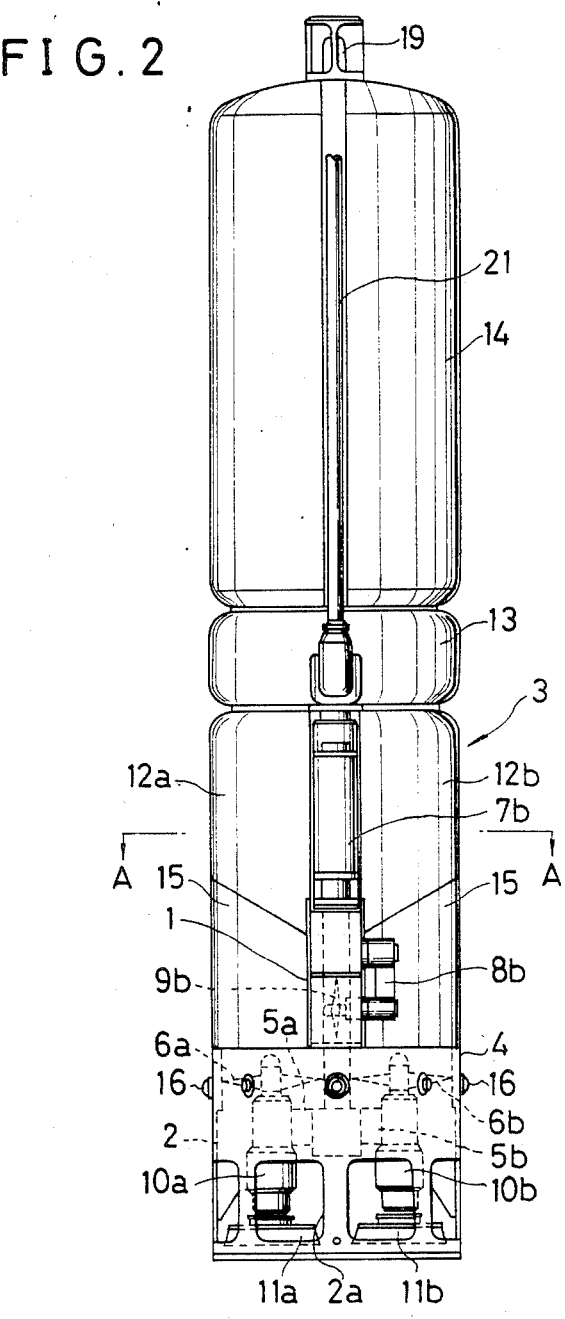
FIG. 2 is a side view of the stirrer of this invention.
Figure 3:
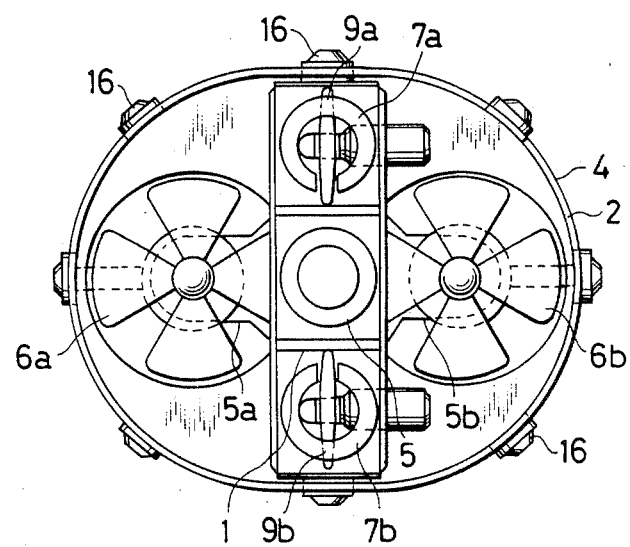
FIG. 3 is a plan view of the stirrer taken on the line A—A in FIG. 2.

As can be seen from FIGS. 1-3, this device consists of a vertical frame 1, and an elliptical housing 2 fixed to the lower part of the frame, the housing 2 being provided with several windows 2a. These elements together form frame 4 which is the skeletal structure of the stirrer 3.

On the upper part of frame 1, a motor 5 is provided which drives the vertical rotors 6a, 6b arranged symmetrically on either side of elliptical housing 2. Rotation is transmitted to rotors 6a, 6b by means of gearboxes 5a, 5b connected to the shaft of motor 5. Rotors 6a, 6b consist of impellers with several blades, and their rotation sets up a practically perpendicular fluid flow. On either side of the motor 5, there are a pair of motors 7a, 7b, and gearboxes 8a, 8b installed in vertical frame 1. On either side of frame 1, there are also horizontal rotors 9a, 9b oriented so as to set up a practically horizontal fluid flow. These rotors 9a, 9b are driven by motors 7a, 7b.

Rotating brushes 11a, 11b are arranged via bearing boxes 10a, 10b in the lower part of elliptical housing 2, and are connected to the shafts of rotors 6a, 6b respectively such that they rotate together with them.

On the upper part of frame 4, a pair of primary buoyancy tanks 12a, 12b, which have a semicylindrical form and are hollow, are arranged so as to enclose between them the upper part of frame 1 and the motors 5, 7a, 7b. The lower parts of the tanks are fixed to frame 1, and the upper parts are fixed in a one piece construction to the joint box 13 provided at the upper end.

In addition a secondary buoyancy tank 14, which has an elliptic cylindrical form, is vertical and is of large volume, is positioned on the upper part of joint box 13 to which it is fixed as one piece The upper surfaces of primary buoyancy tanks, 12a, 12b slant away from frame 1 towards the exterior so as not to offer any resistance to the vertical flow of fluid set up by said rotors 6a, 6b.

Between primary buoyancy tanks 12a, 12b, frame 1 and elliptical housing 2, a flow plate 15 is arranged at right angles to frame 1, that is, parallel to the fluid flow set up by both the rotors 6a, 6b and the rotors 9a, 9b. This flow plate 15 is fixed to tanks 12a, 12b, frame 1 and elliptical housing 2, and also serves to provide greater strength.

Several obstacle detectors 16 are installed on the outer wall of elliptical housing 2. These obstacle detectors 16 use tape switches, limit switches or pressure sensitive switches, or any other common device which emits a signal when it comes into contact with an obstacle.

A depth finder 17 is fitted to joint box 13, and may for example consist of a strain gauge, potentiometric gauge or Bourden tube pressure gauge. It is so designed as to output a depth signal due to the pressure detected when the stirrer 3 is immersed in the liquid in the tank.

Figure 4:
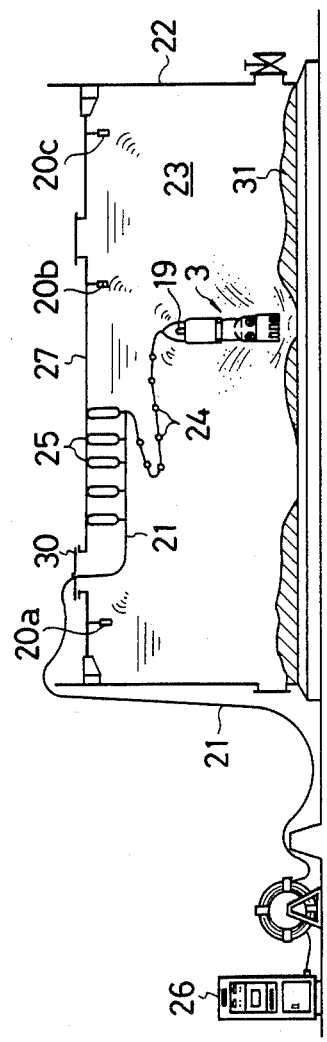
FIG. 4 is a vertical sectional view through a liquid storage tank containing the stirrer of this invention.
Figure 5:
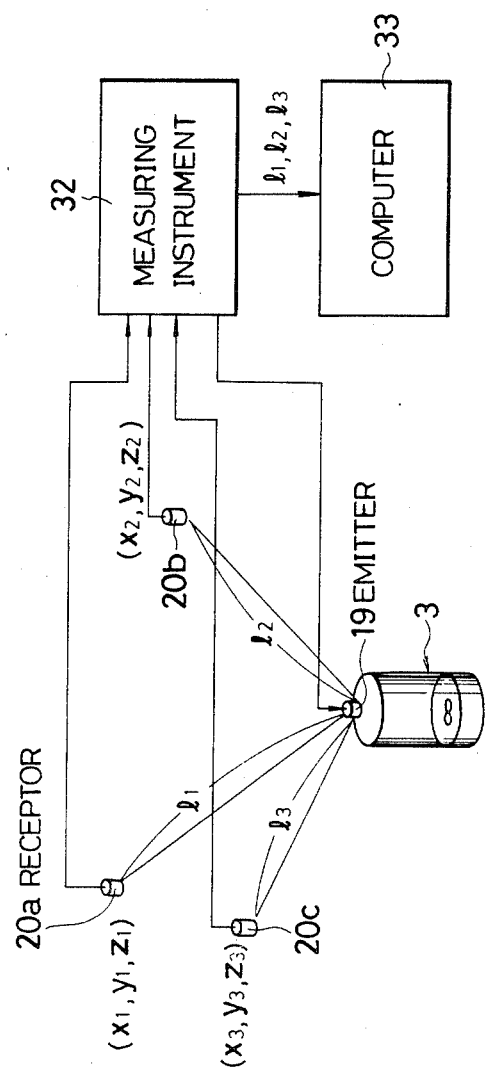
FIG. 5 is a diagrammatic view of the parts involved in determining the position of the stirrer.

A position finding device is provided, as shown in FIGS. 4 and 5, for determining the position of the stirrer in the liquid in the tank.

This position finding device involves the use of an ultrasonic wave system. An ultrasonic emitter 19, for example of the cylindrical piezo-electromagnetic type, is fitted to the center of the upper part of secondary buoyancy tank 14. Three receptors 20a, 20b, 20c, which are intended to receive the ultrasonic wave pulse and are suspended from the roof 27 of tank 22, are then placed in their respective positions.

Figure 6:
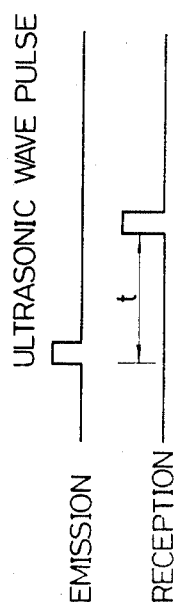
FIG. 6 is a waveform diagram showing the relation between the ultrasonic pulse emitted and the pulse received.

As can be seen from FIGS. 5 and 6, when an ultrasonic pulse is emitted at fixed time intervals from the emitter 19, the time (t) required for this pulse to reach the receptors 20a, 20b and 20c ($t_1$, $t_2$, $t_3$), is directly proportional to the distance from the emitter to the receptor. The distance from emitter 19 to each of the receptors 20a, 20b and 20c, that is $l_1$, $l_2$, $l_3$, may then be measured by multiplying the respective times $t_1$, $t_2$, $t_3$ recorded by measuring instrument 32, by the velocity of sound. A computer 33 is provided to compute the position of stirrer 3 in the liquid storage tank from the distances $l_1$, $l_2$, $l_3$.

As shown in FIG. 5, if the position of the ultrasonic emitter 19 in three-dimensional coordinates is (x, y, z), the positions of the ultrasonic receptors 20a, 20b, 20c in the same coordinate system are ($x_1$, $y_1$, $z_1$), ($x_2$, $y_2$, $z_2$), ($x_3$, $y_3$, $z_3$), and the distances $l_1$, $l_2$, $l_3$ are determined, the point (x, y, z) may be found from the following equations (1)–(3):

$$(x-x_1)^2+(y-y_1)^2+(z-z_1)^2=l_1^2 \qquad (1)$$

$$(x-x_2)^2+(y-y_2)^2+(z-z_2)^2=l_2^2 \qquad (2)$$

$$(x-x_3)^2+(y-y_3)^2+(z-z_3)^2=l_3^2 \qquad (3)$$

If the receptors 20a, 20b, 20c are arranged at the same height ($z_1=z_2=z_3$), the computation is simplified.

The ultrasonic emitter 19 is made to emit several pulses separated by a given time internval, and the computer 33 performs the computation described above for each pulse.

Figure 7:
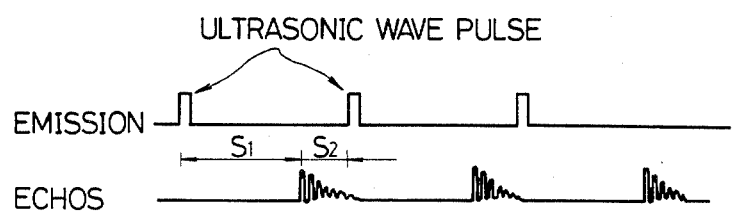
FIG. 7 is a waveform diagram showing the relation between the ultrasonic pulse and the echos inside the tank.

By repeating this computation several times and taking the average, it is possible to obtain an accurate measurement for the position of the stirrer with very little error. If, however, motors 5, 7a and 7b are running when the ultrasonic pulse is emitted, errors of measurement can easily arise due to noise. All motors are therefore first stopped, and the pulse is emitted after a certain time has elapsed, that is, after the stirrer has settled on the bottom of tank 22. In carrying out the measurement, the interval of ultrasonic emission is determined by the maximum value of the distance to be measured (equivalent to the diameter of the tank). If however there are considerable echos due to collision of the ultrasonic wave with and reflection from the tank inner wall, the interval is determined as shown in FIG. 7 by time consisting of the time $s_1$ corresponding to the greatest distance of traverse, plus the time $s_2$ required for the echos to absorb completely.

Even in this case, however, the ultrasonic receptors 20a, 20b, 20c may receive echos after they have received the first pulse until the next pulse emission begins. The measuring instrument 32 therefore treats the first pulse received as correct information, and ignores the subsequent echos. This is because the shortest distance between the emitter 19 and the receptors 20a, 20b, 20c is the straight line distance connecting them, and echos which do not take this path but are reflected must necessarily be received after the regular pulse has arrived.

The motor drive and signal cable 21 attached to the stirrer 3 is wired along the secondary buoyancy tank 14. This cable 21, as shown in FIG. 4, is supported by floats 24, 25 positioned in the liquid 23 contained in tank 22, and is connected to the control unit 26 outside tank 22.

Figure 8:
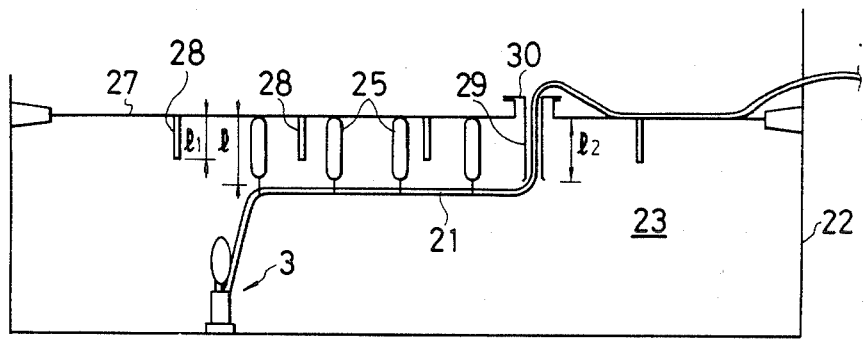
FIG. 8 is a vertical sectional view through a tank showing how the stirrer cable is connected.

If the roof 27 of the liquid tank 22 is of the floating type, the ends of the floats 25, as shown in FIG. 8, come into contact with roof 27. The length l of the floats 25 is greater than the length $l_1$ of the columns 28, so that cable 21 does not become tangled around columns 28 which support floating roof 27 when it reaches the bottom of the tank. If a cable duct 29 is provided for cable 21 to the floating roof 27, the length l of the floats 25 is of course chosen to be greater than the length $l_2$ of the duct.

The control unit 26 determines the position of stirrer 3 when the above position finding device is operated. It also drives motors 5, 7a, 7b and controls the motion of the stirrer based on the position found, the contact signals received from said obstacle detectors 16, and the depth signal from depth finder 17.

Alarm indicators are provided on the control unit to show the status of stirrer position, depth and contact with obstacles. A manual operation switch and auto operation switch are provided so that the control operations can be performed either manually or automatically as desired.

As shown in FIG. 4, the stirrer is introduced into tank 22 through a manhole 30 in the roof. When the stirrer is introduced, it is adjusted by means of the primary and secondary buoyancy tanks 12a, 12b and 14, such that is weight in the liquid is practically zero.

The motors 5, 7a, 7b are started from control unit 26 and, by rotating the vertical rotors 6a, 6b and the horizontal rotors 9a, 9b in a given direction or in the reverse direction, the stirrer is made to rise, fall, move forwards or backwards horizontally, or change its direction.

If the vertical rotors 6a, 6b are rotated clockwise, liquid is pushed vertically downwards by the impeller blades, and stirrer 3 therefore rises. If rotors 6a, 6b are rotated in a reverse direction, liquid is pushed vertically upwards and stirrer 3 falls.

If the horizontal rotors 9a, 9b are rotated clockwise, liquid 23 is pushed back horizontally, and the stirrer moves forward. If rotors 9a, 9b are rotated counterclockwise, liquid 23 is pushed forwards, and stirrer 3 moves backward. Further, if rotors 9a, 9b are rotated in mutually opposite directions, the direction of the stirrer changes.

Thus, as the stirrer moves almost uniformly through liquid storage tank 22, the rotors 6a, 6b or rotors 9a, 9b stir the liquid at the same time. This causes the sludge which tends to separate out from the liquid and accumulate on the bottom of storage tank 22 to be stirred, lifted up by the flow, dispersed, and prevented from accumulating on the bottom. Further, when the stirrer is on the bottom of tank 22, the rotating brushes 11a, 11b are driven to mechanically pulverize the sludge and shear through it. The sludge thus becomes finer, floats up and is carried on the upward flow produced by rotors 6a, 6b, tending to promote its redissolution in the liquid.

As has already been mentioned, vertical buoyancy tanks 12a, 12b and 14 are fitted to frame 4 in a one piece construction. As a result, when the stirrer 3 is moving forwards or backwards and loses its balance or oscillates, there is a strong vibration damping effect and restoring force tending to maintain its orientation stable.

Due to buoyancy tanks 12a, 12b and 14, the weight of stirrer 3 in the liquid is practically zero. It does not therefore require such large driving force to make the stirrer rise. Similarly, there are no sudden falls when the stirrer is falling, and damage due to collision of the stirrer with the bottom of storage tank 22 is avoided.

The stirrer 3 is also provided with a flow plate 15. When the stirrer is moving forwards or backwards, therefore, its direction is constrained by this flow plate 15, so that motion is executed in a perfectly straight line.

This sequence of operations can be performed manually while watching various indicators on control unit 26, and automatically by means of a control program set up in control unit 26.

In the case of automatic operation, control unit 26 first lifts the stirrer from a resting position on the bottom of the tank, moves it horizontally by a given distance, allows it to settle on the bottom again, and stirs the liquid. This normal control sequence is effected as follows.

Motors 5, 7a and 7b are driven so as to rotate vertical rotors 6a, 6b clockwise, and horizontal rotors 9a, 9b both clockwise. These rotations cause the stirrer to move forwards while rising. After rotors 6a, 6b have been rotated clockwise for a time $T_1$, they are rotated in a reverse direction for a time $T_2 (T_1 < T_2)$, and rotors 9a, 9b are stopped after a time $T_3$.

These operations cause the stirrer 3 to move forward a given distance and to fall to the bottom of the tank 22. The rotating brushes 11a, 11b are then rotated so as to remove sludge 31 adhering to the bottom of the tank and clean the bottom. After the rotors 6a, 6b have rotated in the reverse direction for time $T_2$, control unit 26 again rotates rotors 6a, 6b clockwise for a time $T_1$, and rotates rotors 9a, 9b for a time $T_3$. By repeating these operations over and over again, the stirrer 3 is made to rise, fall and move forward stirring and cleaning liquid storage tank 22 as it does so.

If, during the above operations, a signal is received from the obstacle detectors 16 indicating that the stirrer has come into contact with an obstacle or with the inner wall of tank 22, evasive action is taken.

This evasive action consists of lifting the stirrer from its position and rotating it, the direction of this rotation and the magnitude of the angle of rotation being completely random. If this action were given some regularity, the stirrer's motion would fall into a steady pattern (such as, for example, executing a back and forth motion between opposite walls), which it is intended to avoid. This control sequence is effected as follows.

If rotors 6a, 6b are rotating counterclockwise, control unit 26 drives motor 5 so as to rotate them clockwise; while if rotors 6a, 6b are rotating clockwise, motor 5 is driven so as to continue this clockwise rotation. At the same time, motors 7a, 7b are driven so as to rotate rotors 9a, 9b in the opposite direction to one another. Due to the clockwise rotation of rotors 6a, 6b, and the rotation of rotors 9a, 9b in mutually opposite directions, stirrer 3 rises while rotating about its own axis.

The stirrer is made to rise for a time $T_4$, following which rotors 6a, 6b are rotated counterclockwise for a time $T_5$ ($T_4 < T_5$), and rotors 9a, 9b are stopped after a time $T_6$ ($T_6 < 2T_4$). Due to these operations, the stirrer body rotates, and then falls and settles on the bottom of the tank. The direction of this rotation is determined by the mutually opposed directions of rotation of rotors 9a, 9b, and the angle of rotation is determined by $T_6$. The choice of direction and the magnitude of $T_6$ depend on the signals from the random signal generator incorporated in control unit 26.

If control unit 26 continues to receive signals from the obstacle detectors 16 even after the end of period $T_6$, the above control operations are repeated until no further signals are received. When no further signals are received, the stirrer is operated normally as described previously.

Control unit 26, apart from carrying out normal control and obstacle evasion control, also determines the depth and position of the stirrer by receiving signals from depth finder 17 and the position finding device. The range of movement of the stirrer can be set depending on its depth and position.

Figure 9:
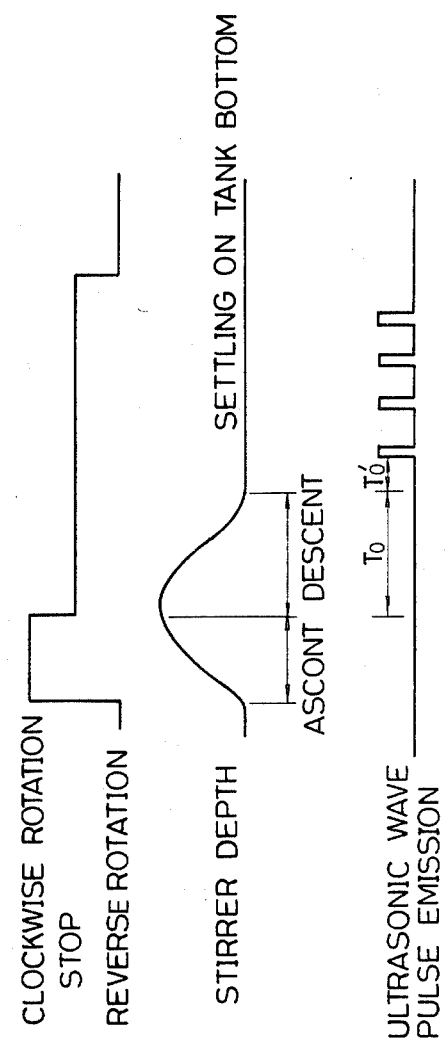
FIG. 9 is a waveform diagram showing control of the stirrer rotors, and control of ultrasonic pulse emission.

The position of the stirrer is determined as described previously. In carrying out the determination, control unit 26 operates the position finding device when the stirrer is at rest, as shown by FIG. 9. As shown in FIG. 9, the stirrer body 3 rises when rotors 6a, 6b are rotating clockwise. When rotation is stopped, however, the stirrer body 3 falls under its own weight, and settles on the bottom of the tank after a time $T_0$. After a further time $T'_0$, an ultrasonic wave pulse is emitted from ultrasonic emitter 19 in the position finding device, and the position of the stirrer is determined. This determination is carried out with the stirrer stationary on the bottom of the tank in order to eliminate the effect of noise due to motors 5, 7a and 7b, and to give a stable reading for the position.

When the stirrer reaches the limit of the set range of movement, depending on the position found, control unit 26 rotates rotors 6a, 6b and rotors 9a, 9b, and changes the direction of stirrer 3 as in the obstacle evasion sequence. If stirrer 3 was rising, it is made to fall. By setting the range of movement beforehand, therefore, the stirrer moves only over the set range, and stirs the liquid in the tank efficiently.

What is claimed is:

1. A method for determining the position of a motor-driven stirrer which is movable through a liquid in a tank while stirring such liquid, comprising the steps of placing an ultrasonic wave emitter on said stirrer, arranging a plurality of receptors at different locations in said tank, operating motors on the stirrer to move said stirrer within said tank, stopping said motors such that said stirrer rests on the bottom of said tank in a first position, emitting ultrasonic pulses from said emitter to said receptor while said stirrer rests on the bottom of said tank in said first position, measuring the time required for said pulses to reach each of said receptors, the time required for said pulses to reach each receptor being related to the distance between said emitter and each of said receptors, disposing a computer outside of said tank, and calculating said first position of said stirrer in said tank based on said measured times by feeding the latter to said computer which computes the position of said stirrer in said tank.

2. A method according to claim 1 further comprising emitting a plurality of pulses from said emitter separated by a time interval.

3. A method according to claim 2 further comprising measuring the plurality of times required for each of said plurality of pulses to reach each of said receptors, performing a plurality of position calculations based on said plurality of times, and utilizing the average of said plurality of position calculations to accurately determine the position of said stirrer in said tank.

4. A method according to claim 2 wherein said time interval is greater than the time required for the ultrasonic pulses to traverse the maximum dimension of said tank.

5. A method according to claim 2 wherein said time interval is greater than the time required for the ultrasonic pulse to traverse the maximum dimension of said tank plus the time required to absorb echoes reflected from the inner wall of the tank.

6. A method according to claim 1 further comprising utilizing only the first pulse detected in each pulse cycle for calculating said position.

7. A method according to claim 1 further comprising operating said motors to move said stirrer to a different location within said tank, stopping said motors such that said stirrer rests on the bottom of said tank in a second position, and repeating the aforesaid steps to compute the second position of said stirrer in said tank.

8. A method according to claim 1 further comprising detecting the depth of said stirrer in said liquid in said tank.

9. A method according to claim 1 further comprising detecting when said stirrer contacts an obstacle in said tank.

10. A method for determining the position of a stirrer which is movable through a liquid in a tank, comprising the steps of placing an ultrasonic wave emitter on said stirrer, arranging a plurality of receptors at different locations in said tank, emitting ultransonic pulses from said emitter to said receptors while said stirrer is in a first position in said tank, measuring the time required for said pulses to reach each of said receptors, the time required for said pulses to reach each receptor being relates to the distance between said emitter and each of said receptors, disposing a computer outside of said tank, and calculating said first position of said stirrer in said tank based on said measured times by feeding the latter to said computer which computes the position of said stirrer in said tank.

11. A method according to claim 10 wherein said step of calculating said first position of said stirrer comprising calculating the three dimensional coordinates representing said first position.

* * * * *